US011616765B2

(12) United States Patent
Upadhyay

(10) Patent No.: US 11,616,765 B2
(45) Date of Patent: Mar. 28, 2023

(54) PRACTICAL PRIVATE ALGORITHMS FOR ROBUST STATISTICS

(71) Applicant: Apple Inc., Cupertino, CA (US)

(72) Inventor: Jalaj Kumar Upadhyay, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/242,187

(22) Filed: Apr. 27, 2021

(65) Prior Publication Data

US 2022/0038436 A1  Feb. 3, 2022

Related U.S. Application Data

(60) Provisional application No. 63/059,687, filed on Jul. 31, 2020.

(51) Int. Cl.
*H04L 29/06* (2006.01)
*H04L 9/40* (2022.01)
*G06F 17/16* (2006.01)

(52) U.S. Cl.
CPC .......... *H04L 63/0428* (2013.01); *G06F 17/16* (2013.01)

(58) Field of Classification Search
CPC ..... G06F 17/18; G06F 17/16; H04L 63/0428; H04L 63/0421
USPC .......................................... 726/26
See application file for complete search history.

(56) References Cited

U.S. PATENT DOCUMENTS

| 7,668,852 | B2 * | 2/2010 | Eshghi ............... G06F 21/6254 707/755 |
| 9,043,250 | B2 * | 5/2015 | Ling ................... G06F 21/6254 703/2 |
| 9,658,987 | B2 * | 5/2017 | Avron .................... G06N 20/10 |
| 9,928,214 | B2 * | 3/2018 | Avron .................... G06F 17/16 |
| 10,007,643 | B2 * | 6/2018 | Woodruff ............... G06F 17/18 |
| 11,106,790 | B2 * | 8/2021 | Wojnowicz .......... G06F 21/554 |
| 2014/0196151 | A1 * | 7/2014 | Mishra .................. G06F 16/258 726/26 |

* cited by examiner

*Primary Examiner* — Amare F Tabor
(74) *Attorney, Agent, or Firm* — Kilpatrick Townsend & Stockton LLP

(57) ABSTRACT

Embodiments described herein provide a privacy mechanism to protect user data when transmitting the data to a server that estimates a p-th frequency moment, $F_p$ for $p \in [1, 2]$ and $\ell_p$ low-rank approximation for $p \in [1, 2)$. The privacy mechanism uses an encode-shuffle then analyze (ESA) framework that provides a compromise between the central and local model of privacy.

25 Claims, 10 Drawing Sheets

US 11,616,765 B2

PRACTICAL PRIVATE ALGORITHMS FOR ROBUST STATISTICS

CROSS-REFERENCE

This application claims the benefit of priority of U.S. Provisional Application No. 63/059,687 filed Jul. 31, 2020 which is incorporated herein by reference.

TECHNICAL FIELD

This disclosure relates generally to the field of differential privacy. More specifically, this disclosure relates to a system that provides an enhancement to shuffle-based differential privacy.

BACKGROUND

As the amount of information collected in an online environment grows, individuals are increasingly protective of providing various forms of information. Accordingly, differential privacy has become an important consideration for providers that aggregate online information. In a crowd-sourced, client/server environment, local differential privacy introduces randomness into user data prior to a client sharing the user data with a server. A server can learn from the aggregation of the crowdsourced data of all clients, but the server cannot learn the data provided by any particular client. As more user information is gathered, general patterns begin to emerge, which can inform and enhance the user experience. Accordingly, differential privacy provides insights from large datasets, but with a mathematical proof that information about a single individual remains private.

There are two well-studied models for implementing differentially-private algorithms. In the central model, a central server gets the raw-data and implements a differentially-private algorithm. In the local model, each individual applies a differentially-private algorithm locally to their data and shares only the output of the algorithm, which is then aggregated by the server.

SUMMARY

Embodiments described herein provide a privacy mechanism to protect user data when transmitting the data to a server that estimates a frequency moment and $\ell_p$ low-rank approximation based on privatized data received from client devices. In one embodiment, $(\varepsilon, \delta)$-differential privacy is enabled via the shuffle model of privacy.

One embodiment provides a client computing device comprising one or more memory devices, the one or more memory devices to store executable instructions and a dataset having a universe of values, the universe of values having a first number of values and one or more processors configured to execute the instructions stored on the memory device. The instructions cause the one or more processors to implement a local randomizer for the dataset. The local randomizer has a specified privacy parameter and the instructions cause the one or more processors to generate a matrix based on independent and identically distributed samples of a p-stable distribution of the dataset, where the matrix includes a first number of columns, a second number of rows, the first number of columns is larger than the second number of columns, and the first number of columns is the first number of values of the universe. The instructions further cause the one or more processors to generate a sketch having a size based on the second number, apply a first randomization function to the coordinates of the sketch to generate a randomized sketch, and transmit a report to a server, the report including the randomized sketch. The randomized sketch enables estimation of a frequency moment of the universe of values via a non-private estimator while maintaining differential privacy for the dataset.

One embodiment provides a server computing device comprising one or more memory devices, the one or more memory devices to store executable instructions, and one or more processors configured to execute the instructions stored on the memory device. The instructions cause the one or more processors to implement an analyzer to estimate a frequency moment of a dataset and the instructions cause the one or more processors to receive a report from a client device, the report including a randomized sketch, the randomized sketch generated by the client device based on the dataset having a universe of values, the universe of values having a first number of values, and the randomized sketch having a size based on a second number that is less than the first number, wherein the randomized sketch was generated from a randomization matrix having the first number of columns and the second number of rows, combine the randomized sketch from the client device with a set of randomized sketches received from a plurality of other client devices to generate a cumulative sketch, and estimate the frequency moment of the dataset based on the cumulative sketch, wherein the frequency moment is estimated via a first non-private estimator while maintaining differential privacy for the dataset.

One embodiment provides a system comprising a client device including one or more memory devices and one or more processors. The one or more memory devices are to store executable instructions and a dataset having a universe of values, the universe of values having a first number of values and the one or more processors are to execute the instructions stored on the memory device. The instructions cause the one or more processors to implement a local randomizer for the dataset, where the local randomizer has a specified privacy parameter. The instructions additionally cause the one or more processors to perform operations comprising generating a matrix based on independent and identically distributed samples of a p-stable distribution of the dataset, wherein the matrix includes the first number of columns, a second number of rows, and the first number is larger than the second number, generating a sketch having a size based on the second number, applying a first randomization function to the coordinates of the sketch to generate a randomized sketch, and transmitting a report to a server, the report including the randomized sketch, wherein the randomized sketch enables privatized estimation of a frequency moment or a low-rank approximation based on the dataset.

Other features of the present embodiments will be apparent from the accompanying drawings and from the detailed description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements.

DETAILED DESCRIPTION

Figure 1:
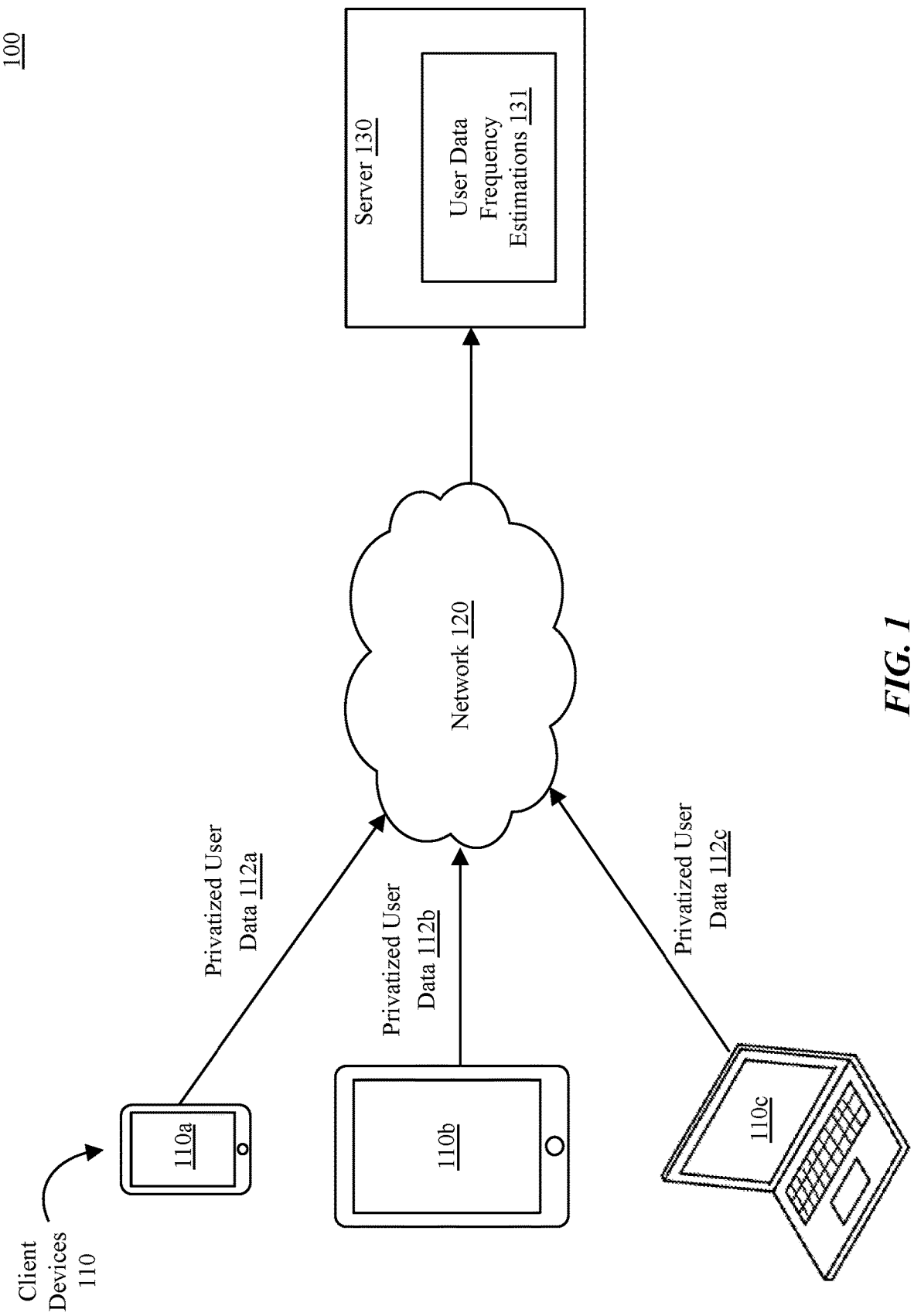
FIG. 1 is a block diagram illustrating an example overview of a system environment according an embodiment of the disclosure.

The encode-shuffle then analyze (ESA) framework provides a compromise between the central and local model of privacy. Described herein is an implementation of the ESA model of privacy with n users, a trusted shuffler, and an untrusted analyst (henceforth, shuffle model of privacy). The implementation described herein enables differentially private estimation of a p-th frequency moment $F_p$ for $p \in [1, 2]$ and $\ell_p$ low-rank approximation for $p \in [1, 2)$. The estimations are performed with higher accuracy than existing techniques. As described herein, where $\mathbb{R}$ denotes the set of real numbers, for a vector $v \in \mathbb{R}^d$, let v[i] denote the i-th coordinate of vector v and $\ell_p(v)$ denote the $\ell_p$ norm of vector v, such that:

$$F_p(v) = \sum_{i=1}^{d} |v[i]|^p = (\ell_p(v))^p$$

The techniques described herein are easy to implement at large scale and the theoretical guarantees translate to empirically observable improvements.

The specific instances of these problems are used extensively in robust statistics and have wide ranging applications, including detection of heavy hitters, which are high frequency items in a dataset. Statistical techniques may also be used, for example, to enable protection against denial of service, estimating the selectivity and execution of queries, clustering, data mining, recommendation systems, conic fitting problems, information retrieval, learning distributions, system control, and web searching. Accordingly, advances in algorithms that are both practical and private directly advance the computing arts.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

It should be noted that there can be variations to the flow diagrams or the steps (or operations) described therein without departing from the embodiments described herein. For instance, the steps can be performed in parallel, simultaneously, a differing order, or steps can be added, deleted, or modified.

The present disclosure recognizes that the use of personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

FIG. 1 is a block diagram of an overview of such a system 100 according an embodiment of the disclosure. As shown, the system 100 can include client devices 110A-110C (or collectively 110) and a server 130, which can be coupled via a network 120. The network 120 can be any suitable type of wired or wireless network such as a local area network (LAN), a wide area network (WAN), or combination thereof.

A client device 110 can include any type of computing device such as a desktop computer, a tablet computer, a smartphone, a television set top box, or other computing device 110 such as iPhone®, Apple® Watch, Apple® TV, etc., as described below with reference to system 1200. A client device 110 can be associated with a user within a large set of users (e.g. crowdsource). Each client device 110 can transmit privatized user data 112A-C (collectively 112) as a differentially private sketch (or encoding). A sketch is a computed, encoded representation of a value of user data. The purpose of the sketch is to transmit the encoded representation of user data to the server, so that the server cannot directly learn the value of user data transmitted by the particular client. The user data can be any form of information such as information related to a user or information relate to user actions performed on the client device. For example, the value can include a visited website, user interaction or behavior data, words or emojis used by a user, deep links, preferences, data from a questionnaire, or any other data that a user may want or request to remain private. In one embodiment, the user data can be any form of information that is finite and from a known set. For example, the known set can include a predefined set of possible values known by the server 130.

A server 130 can accumulate privatized user data 112 and determine statistical properties such as user data frequency estimations 131 amongst a set of client devices 110. As described, the server 130 can learn from the aggregation of the crowdsourced data, but cannot learn the user data provided by any particular client device 110. The server 130 can be any kind of server or a cluster of servers and can include a cloud-based server, application server, backend server, or combination thereof.

Figure 2:
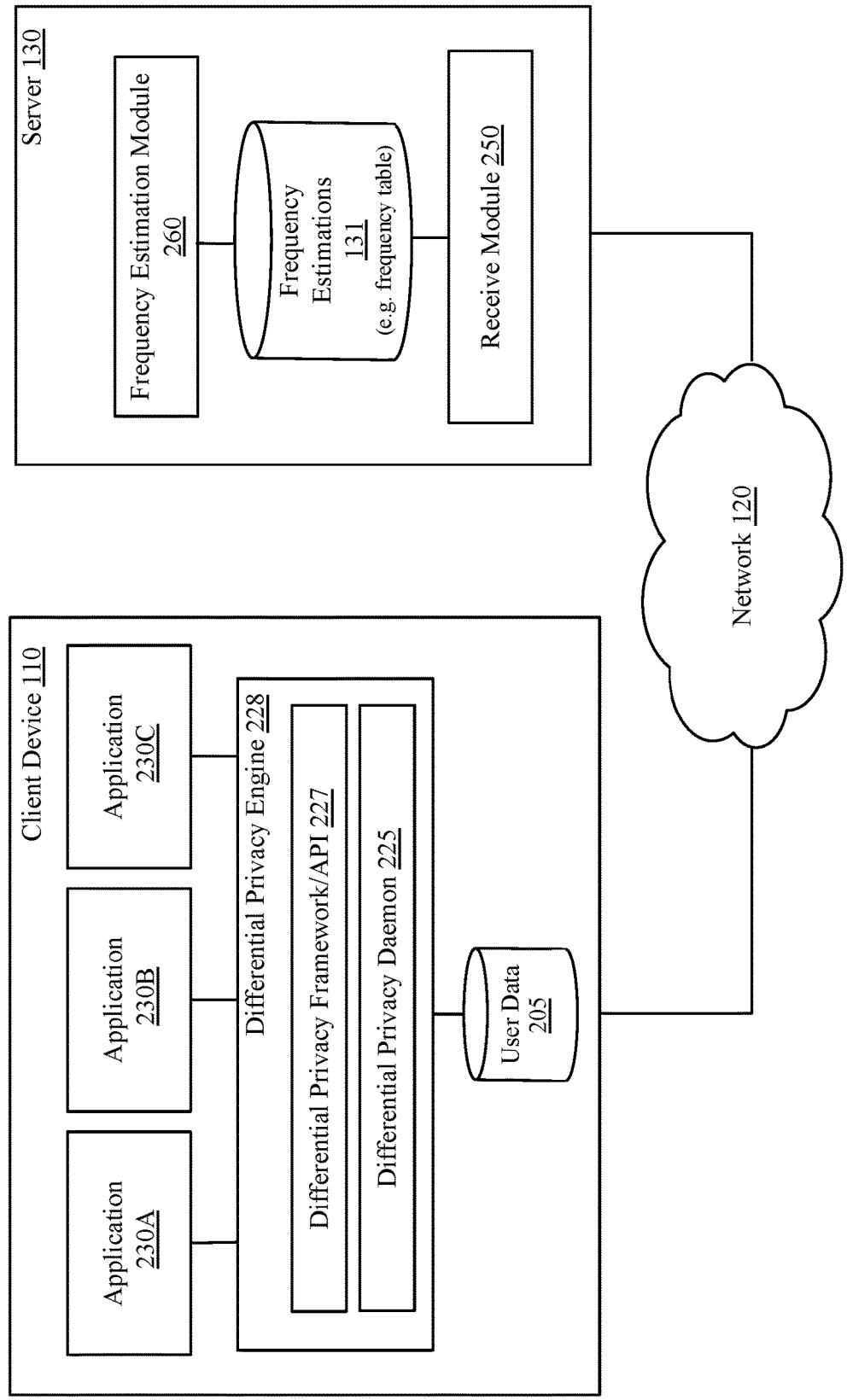
FIG. 2 is a block diagram of systems used for differentially privatizing shared user data according an embodiment of the disclosure.

FIG. 2 is a block diagram of systems 200 used for differentially privatizing user data, according to an embodiment of the disclosure. The client device 110 can include a differential privacy engine (DPE) 228 that includes a differential privacy daemon 225 and a differential privacy framework or application programming interface (API) 227, and a plurality of applications 230A-230C. One or more of the applications 230A-230C can create user data 205 and the DPE 228 can use various tools such as hash functions (or cryptographic hash functions) to privatize the user data 205 using the differential privacy mechanism as further described herein.

In one embodiment, the user data 205 can be stored on the client device in a differentially private form. This user data 205 in a privatized form can be shared (e.g. subsampled) with the server 130, or may be used for other purposes such as for usage and diagnostic purposes. It should be noted that even when the user data 205 is not shared with a server 130, it can still be stored in a differentially private form.

Server 130 may include a receive module 250, and a frequency estimation module 260 to determine frequency estimations 131 that may be stored in various data structures such as a frequency table. The receive module 250 may asynchronously receive crowdsourced data sketches of user data for a large plurality of client devices 110. The receive module 250 can remove latent identifiers from the received sketch data. Latent identifiers can include IP addresses, metadata, session identifiers, or other data that might identify the particular client device 110 that sent the sketch. The frequency estimation module 260 can periodically process the received privatized user data 205. In one embodiment, the frequency estimation module 260 can update a frequency table to determine frequency estimations 131 as further described herein.

Figure 3A:
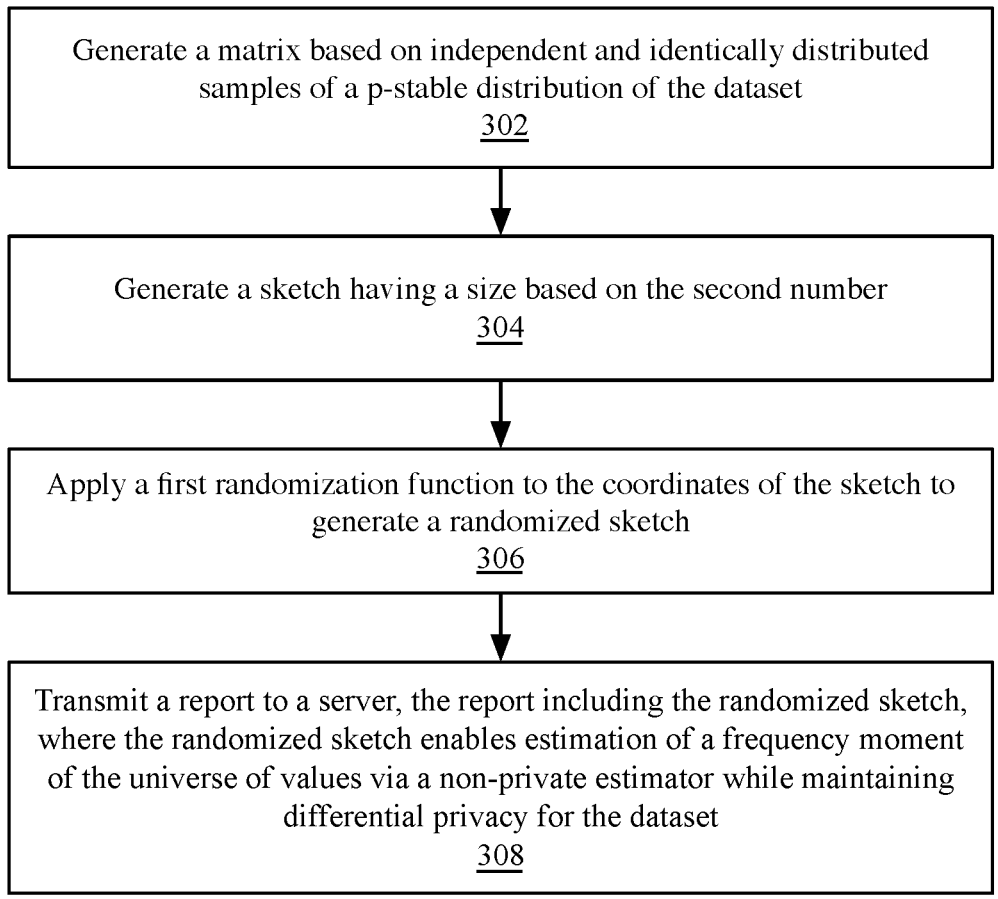
FIGS. 3A-3B are flow diagrams illustrating methods to estimate a frequency moment of a dataset using the shuffle model of privacy.
Figure 3B:
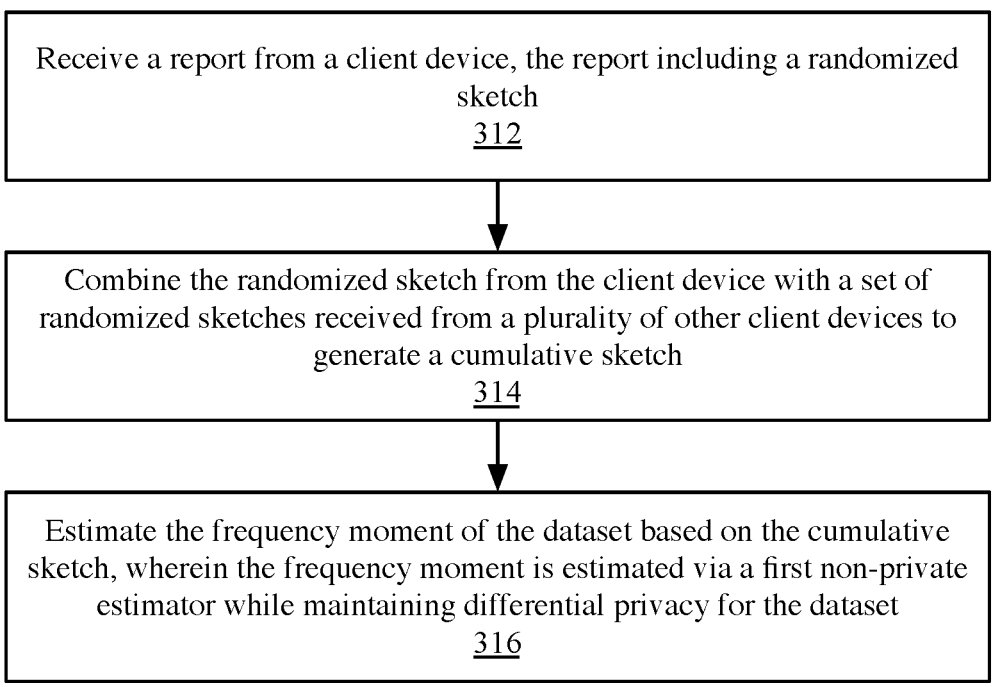

FIGS. 3A-3B illustrate methods 300, 310 of estimating a frequency moment for a dataset. FIG. 3A illustrates an encode and randomize method 300 performed on a client computing device. FIG. 3B illustrates an analysis method 310 performed on a server device.

Method 300 shown in FIG. 3A can be implemented by a client computing device including one or more memory devices and one or more processors to execute instructions stored on the memory device. The one or more processors can be configured to perform the operations of the method 300. The method 300 can be used to implement exemplary local randomizer $\mathcal{R}_{Freq}$ shown below:

---
Local randomizer for frequency moment, $R_{Freq}$
---

Require: user data $x \in \{1, \cdots, U\}$.
Ensure: message vector $y \in \{0, \cdots, q-1\}^*$.
1:     Public parameters: Privacy parameter ($\epsilon$, $\delta$), universe $\{1, \cdots, U\}$, desired frequency moment
       Fp, approximation parameters ($\alpha$, $\beta$), a matrix $M \in \mathbb{R}^{k \times u}$, whose entries are sampled i.i.d from $$a\ p\text{-stable distribution for } p \geq 1 \text{ and } k = \frac{8}{\alpha^2}\log(U/\beta).$$

2:     Define a vector y such that $y[i] := M[i,x]$, where $M[i, x]$ denotes the
       (i, x)-th entry of M.
3:     Set z to be a zero-dimensional vector and $s = \|M\|_\infty$.
4:     for $i = 1, \cdots, k$ do
5:        Append, $z \leftarrow z \| \mathcal{R}_{BBGN}$ (y[i], q, $\sigma$, $\upsilon$) using the sensitivity of function as s
6:     end for
7:     return y.

---

The method includes operations to generate a matrix based on independent and identically distributed samples of a p-stable distribution of the dataset (302). The matrix includes a first number of columns, a second number of rows, and the first number is larger than the second number. The first number can be significantly larger than the second number. For example, the first number of columns may be equal to the first number of values of the universe. The client device can then generate a sketch having a size based on the second number (304). Generating the sketch reduces the size of the universe to a significantly smaller number. The client can then apply a first randomization function to the coordinates of the sketch to generate a randomized sketch (306). The client device can then transmit a report to a server (308). The report includes the randomized sketch and the randomized sketch enables estimation of a frequency moment of the universe of values via a non-private estimator while maintaining differential privacy for the dataset.

In one embodiment, the frequency moment is the $F_1$ frequency moment that indicates an estimate of a number of users that contributed to the dataset. In one embodiment the frequency moment is the $F_2$ frequency moment that indicates a repeat rate of elements in the dataset.

In one embodiment, method 300 can be implemented via an electronic device that includes one or more memory devices that are configured to store executable instructions and a dataset of user data having a known universe of values, where the known universe if values is a first number of values. The one or more processors can be configured to execute the instructions stored on the memory device. The instructions can cause the one or more processors to generate a matrix based on the dataset, where the matrix includes independent and identically distributed samples of the dataset and includes a second number of values that is less than the first number of values, generate a first vector based on the summation matrix, and generate a second vector based on the first vector. The second vector is a randomized shuffle of the first vector. The one or more processors can then transmit the second vector to a server for analysis by a non-private estimator. The non-private estimator is configured to determine an estimate of a frequency moment of the universe of values based on a multiset generated based in part on the second vector. The estimate of the frequency moment is a differentially private estimate, even though the estimate is generated by a non-private estimator.

Method 310 shown in FIG. 3B can be implemented by a server computing device including one or more memory devices and one or more processors to execute instructions stored on the memory device. The one or more processors can be configured to perform the operations of the method 310. Method 310 can be used to implement exemplary analyzer/analyst for frequency moment $\mathcal{A}_{Freq}$, which is shown below:

---
Analyst for frequency moment, $\mathcal{A}_{Freq}$
---

Require: A set of multiset $y_1,...,y_n$.
Ensure: An estimate $\tilde{F}$ of the frequency moment.
  1: Public parameters: Universe $\{1,...,U\}$, query frequency moment $F_p$.
  2: Using the multiset $y_1,...,y_n$, form k sets of multisets $y(1),...,y(k)$ each of dimension nv such that $y(j)$ contains the message for the j-th invocation of randomizer $R_{BBGN}$ by the users.
  3: return $F_p(z)$ using any non-private estimator.

---

The operations of method 310 include, at the server device, to receive a report from a client device (312). The report includes a randomized sketch generated by the client device based on the dataset having a universe of values, the universe of values having a first number of values, and the randomized sketch having a size based on a second number that is less than the first number. The randomized sketch was generated from a randomization matrix having the first number of columns and the second number of rows. The server device can then combine the randomized sketch from the client device with a set of randomized sketches received from a plurality of other client devices to generate a cumulative sketch (314). The server device can then estimate the frequency moment of the dataset based on the cumulative sketch (316). The frequency moment is estimated via a first non-private estimator while maintaining differential privacy for the dataset.

In a further embodiment, the encode-shuffle then analyze framework is further extended to enable privatized low-rank approximation. Values for variables used in the privatized low-rank approximation are shown in Table 1.

TABLE 1

Values of different variables used in the algorithms.

| $C_\phi, C_s$ | $C_\psi, C_t$ | $\phi, \psi, s, t$ |
|---|---|---|
| O(log d) | O(log n) | O(k log k log(1/δ)) |

An algorithm to enable a local randomizer $\mathcal{R}_{LRA}$ to perform privatized low-rank approximation is shown below:

---
Local randomizer, $\mathcal{R}_{LRA}$
---

Require: Input data $a \in \mathbb{R}^d$, target rank k, desired norm $p \in [1,2)$.
Ensure: Matrices $Y_r, Y_c, Z$.
  1: Public parameters: The variables $\phi,\psi,s,t,C_\phi,C_\psi,C_s,C_t$ as in Table 1, and random matrices $\Phi \in \mathbb{R}^{\phi \times n}$, $\Psi \in \mathbb{R}^{d \times \psi}$, $S \in \mathbb{R}^{s \times n}$, and $T \in \mathbb{R}^{d \times t}$ with entries sampled from the distribution $\mathcal{D}_p$.
  2: Construct a matrix A with non-zero row being corresponding to the user.

---
Local randomizer, $\mathcal{R}_{LRA}$
---

3: Compute:
    $y_r(i,j) = \mathcal{R}_{BBGN}((\Phi A)[i,j])$ with privacy parameter $\in/C_\phi$
    $y_c(i,j) = \mathcal{R}_{BBGN}((A\Psi)[i,j])$ with privacy parameter $\in/C_\psi$.
    $z(i,j) = \mathcal{R}_{BBGN}((SAT)[i,j])$ with privacy parameter $\in/C_\psi$.
  4: Define:
    $Y_r = \{y_r(i,j) : 1 \le i \le \phi, 1 \le j \le d\}$,
    $Y_c = \{y_c(i,j) : 1 \le i \le n, 1 \le j \le \psi\}$,
    $Z = \{z(i,j) : 1 \le i \le s, 1 \le j \le t\}$
  5: Report $Y_r, Y_c, Z$.

---

An algorithm to enable an analyzer for low-rank approximation is shown below:

---
Analyst, $\mathcal{A}_{LRA}$
---

Require: Input data is matrices $\{(Y_r^{(i)}, Y_c^{(i)}, Z^{(i)}) : 1 \le i \le n\}$
Ensure: Rank-k matrix $M \in \mathbb{R}^{n \times d}$
  1: Public parameters: The variables $\phi,\psi,s,t,C_\phi,C_\psi,C_s,C_t$ as in Table 1, random matrices $\Phi \in \mathbb{R}^{\phi \times n}$, $\Psi \in \mathbb{R}^{d \times \psi}$, $S \in \mathbb{R}^{s \times n}$, and $T \in \mathbb{R}^{d \times t}$ from distributions $\mathcal{D}_p^{(\phi,n)}$, $\mathcal{D}_p^{(d,\psi)}, \mathcal{D}_p^{(s,n)}$, and $\mathcal{D}_p^{(d,t)}$.
  2: Construct:
    $Y_c[i,j] = \mathcal{A}_{BBGN}(Y_c^{(1)}[i,j],...Y_c^{(n)}[i,j])$,
    $Y_r[i,j] = \mathcal{A}_{BBGN}(Y_r^{(1)}[i,j],...Y_r^{(n)}[i,j])$,
    $Z[i,j] = \mathcal{A}_{BBGN}(Z^{(1)}[i,j],...Z^{(n)}[i,j])$,
  3: SVD: Compute $[U_c, \Sigma_c, V_c] = SVD(SY_c)$, $[U_r, \Sigma_r, V_r] = SVD(Y_r T)$.
  4: $\ell_2$-low-rank approximation: Compute
    $\hat{X} = V_c \Sigma_c^\dagger [U_c^T Z V_r^T]_k \Sigma_r^\dagger U_r^T$,
    where $[B]_k = \arg\min_{r(X) \le k} \|B - X\|_2$.
  5: Output: $M = Y_c \hat{X} Y_r$.

---

Figure 4A:
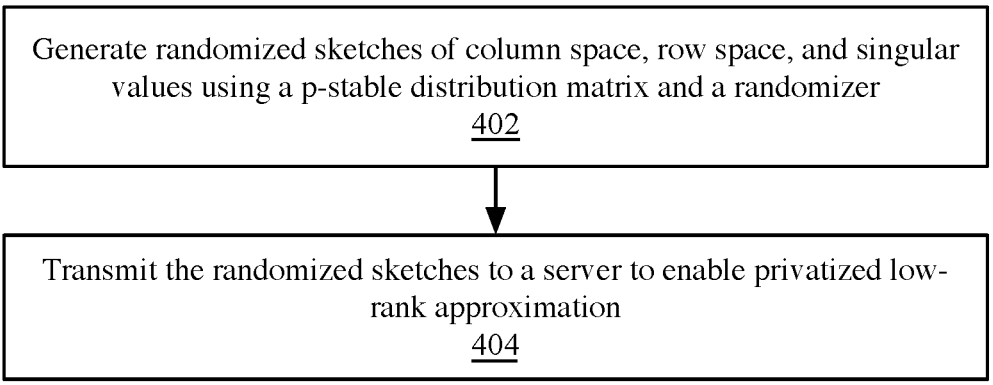
FIGS. 4A-4B are flow diagrams illustrating an exemplary API architecture, which may be used in some embodiments.
Figure 4B:
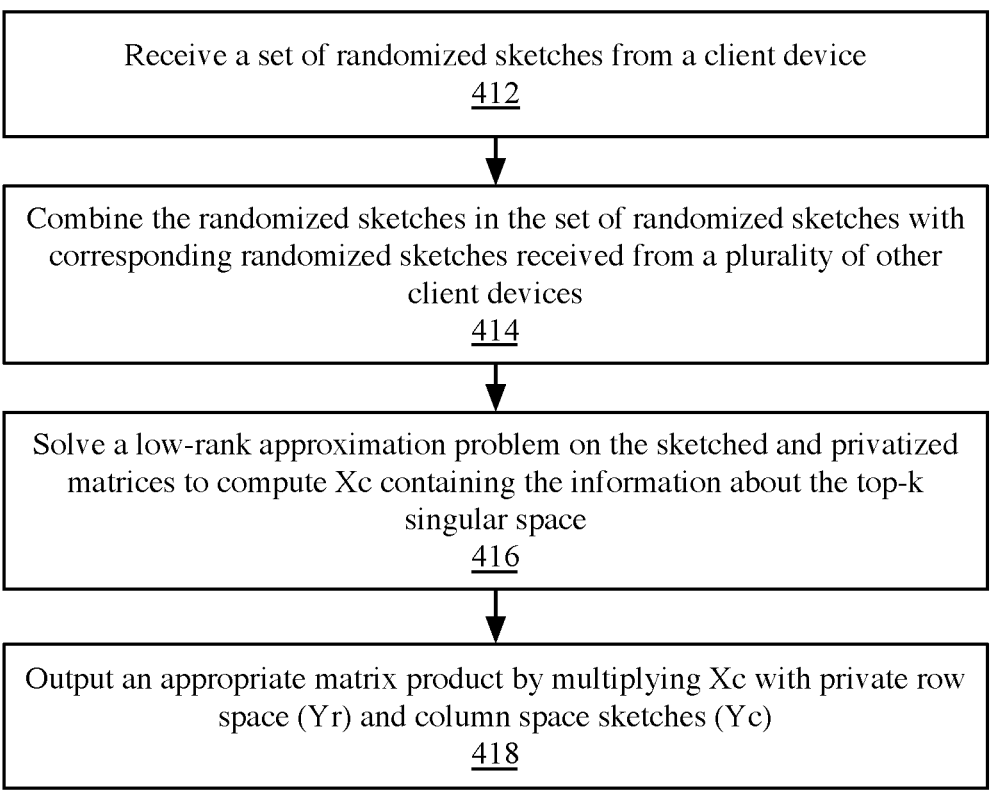

Methods to enable low-rank approximation are shown in FIGS. 4A-4B. Low-rank approximation described herein is $\ell_p$ low-rank approximation for $p \in [1, 2)$. The low-rank approximation method described herein is (ε, δ)-differentially private via the shuffle model of privacy. The above algorithms enable the generation of an approximate solution of a low-rank problem in a projected space. Generating the low-rank approximation can be reduced to a generalized linear regression problem that is solved in the projection space, which also gives an approximate solution to the original low-rank problem of an original space. The projected space is represented by the randomized matrices that are sampled from the p-stable distribution matrix $\mathcal{D}_p$, at least one of which preserves the $\ell_p$-norm of the distribution matrix from which the sketches are sampled.

FIGS. 4A-4B illustrates methods 400, 410 to enable $\ell_p$ low-rank approximation. FIG. 4A illustrates an encode and randomize method 400 performed on a client computing device. FIG. 4B illustrates an analysis method 410 performed on a server device.

Method 400 shown in FIG. 4A can be implemented by a client computing device including one or more memory devices and one or more processors to execute instructions stored on the memory device. The one or more processors can be configured to perform the operations of the method 400. The client computing device can generate a randomized (e.g., private) sketch of the each of the column space $Y_c$, the row space $Y_r$, and singular values Z using a p-stable distribution matrix and a randomizer $\mathcal{R}_{Freq}$ described above (402). The client device then sends the sketches to the server to enable privatized low-rank approximation (404).

Method 410 shown in FIG. 4B can be implemented by a server computing device including one or more memory devices and one or more processors to execute instructions stored on the memory device. The one or more processors can be configured to perform the operations of the method 410.

The server device can receive a set of randomized sketches from a client device (412). The server then combines the randomized sketches in the set of randomized sketches with corresponding ($Y_c$, $Y_r$, $Z$) sketches received from a plurality of other client devices (414). The server can then solve a traditional low-rank approximation problem (e.g., via linear regression) on the sketched and privatized matrices to compute $X_c$, which contains the information about the top-k singular space (416). The server can then output an appropriate matrix product M by multiplying $X_c$ with private row space ($Y_r$) and column space sketches ($Y_c$) (418).

Exemplary Application Programming Interface Diagrams

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 5:
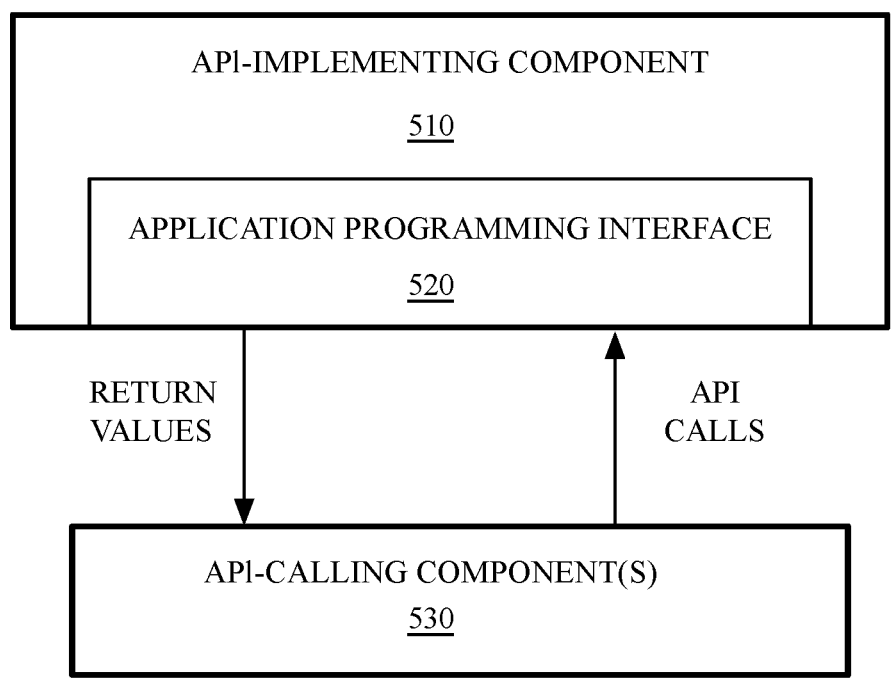
FIG. 5 is a block diagram of exemplary API software stacks, according to embodiments.

FIG. 5 is a block diagram illustrating an exemplary API architecture, which may be used in some embodiments described herein. The API architecture 500 includes the API-implementing component 510 (e.g., an operating system, a library, a device driver, an API, an application program, software or other module) that implements the API 520. The API 520 specifies one or more functions, methods, classes, objects, protocols, data structures, formats and/or other features of the API-implementing component that may be used by the API-calling component 530. The API 520 can specify at least one calling convention that specifies how a function in the API-implementing component receives parameters from the API-calling component and how the function returns a result to the API-calling component. The API-calling component 530 (e.g., an operating system, a library, a device driver, an API, an application program, software or other module), makes API calls through the API 520 to access and use the features of the API-implementing component 510 that are specified by the API 520. The API-implementing component 510 may return a value through the API 520 to the API-calling component 530 in response to an API call.

It will be appreciated that the API-implementing component 510 may include additional functions, methods, classes, data structures, and/or other features that are not specified through the API 520 and are not available to the API-calling component 530. It should be understood that the API-calling component 530 may be on the same system as the API-implementing component 510 or may be located remotely and accesses the API-implementing component 510 using the API 520 over a network. While FIG. 5 illustrates a single API-calling component 530 interacting with the API 520, it should be understood that other API-calling components, which may be written in different languages (or the same language) than the API-calling component 530, may use the API 520.

The API-implementing component 510, the API 520, and the API-calling component 530 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 6A:
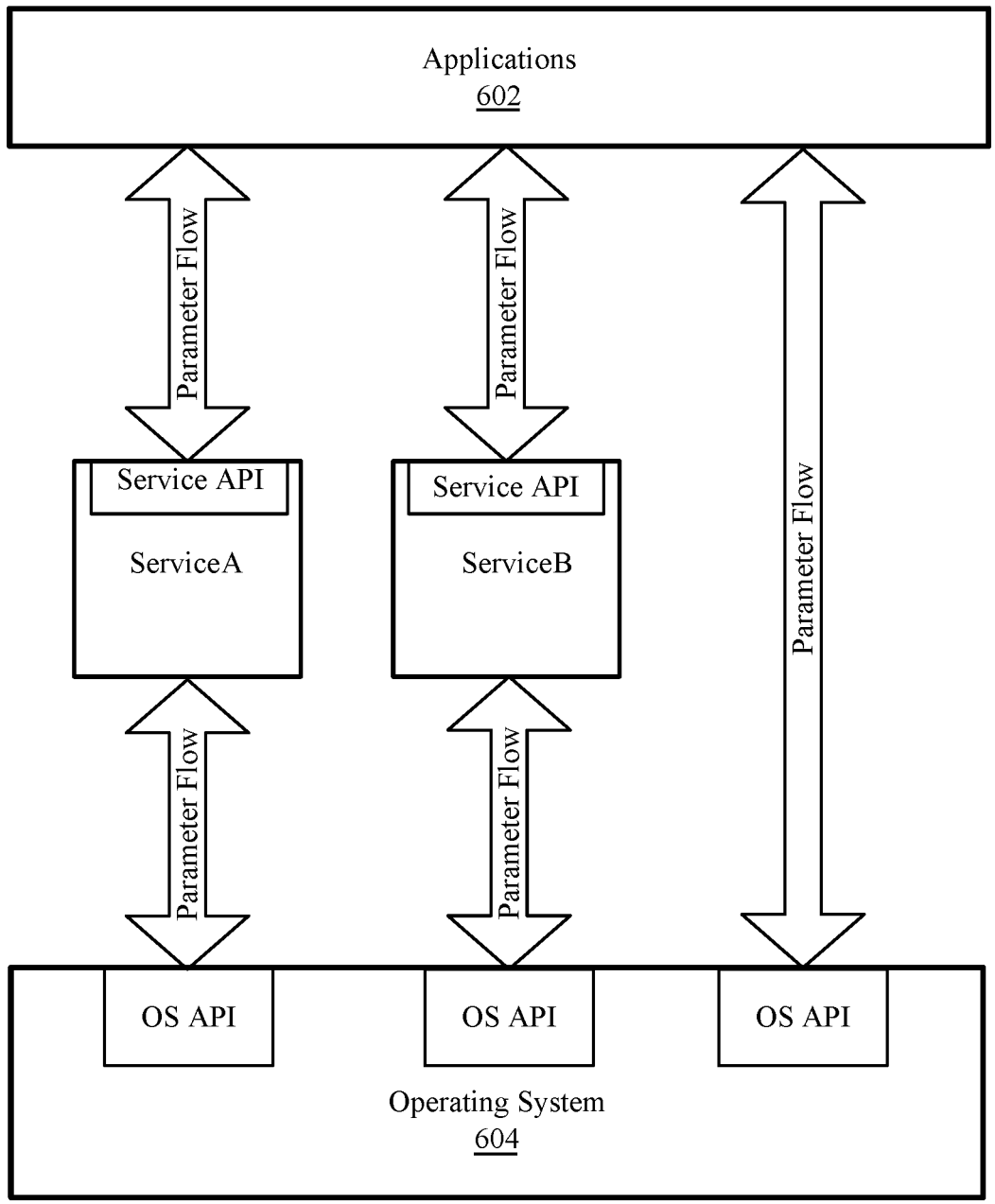
FIGS. 6A-6B are block diagrams of mobile device architecture, according to an embodiment.
Figure 6B:
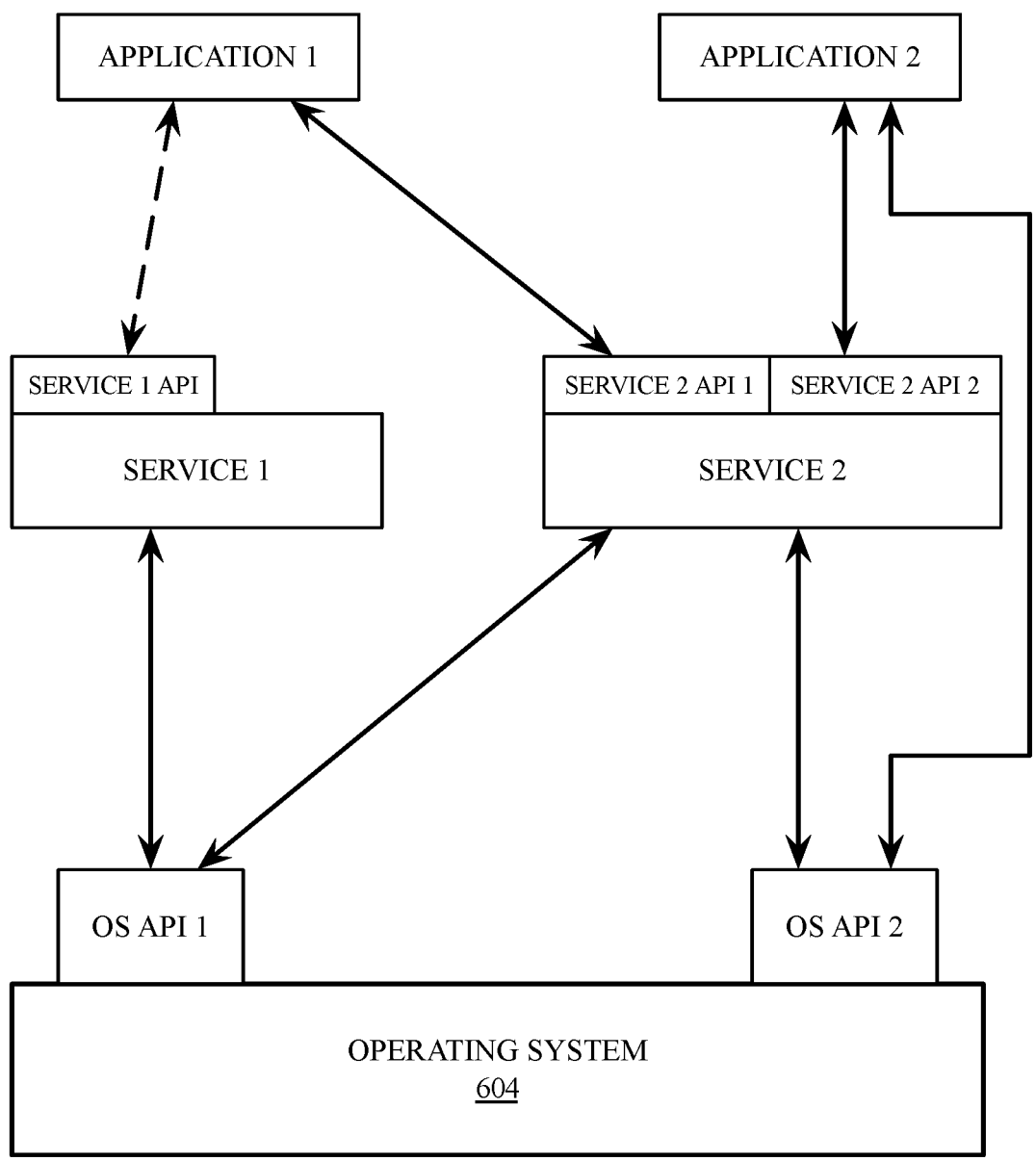

FIGS. 6A-6B are block diagrams of exemplary API software stacks 600, 610, according to embodiments. FIG. 6A shows an exemplary API software stack 600 in which applications 602 can make calls to Service A or Service B using Service API and to Operating System 604 using an OS API. Additionally, Service A and Service B can make calls to Operating System 604 using several OS APIs.

FIG. 6B shows an exemplary software stack 610 including Application 1, Application 2, Service 1, Service 2, and Operating System 604. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Additional Exemplary Computing Devices

Figure 7:
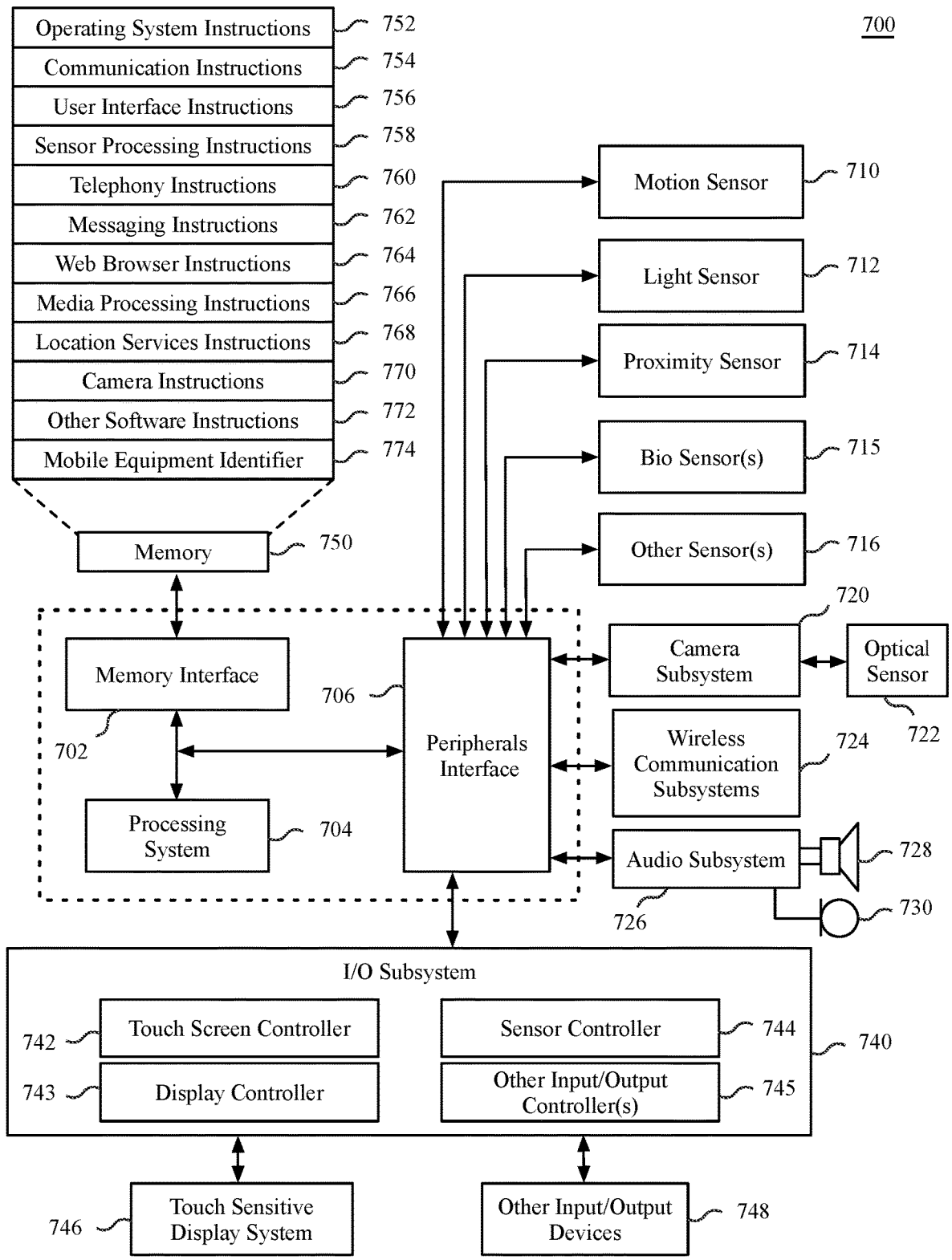
FIG. 7 is a block diagram illustrating an example computing system that can be used in conjunction with one or more of the embodiments of the disclosure.

FIG. 7 is a block diagram of a device architecture 700 for a mobile or embedded device, according to an embodiment. The device architecture 700 includes a memory interface 702, a processing system 704 including one or more data processors, image processors and/or graphics processing units, and a peripherals interface 706. The various components can be coupled by one or more communication buses or signal lines. The various components can be separate logical components or devices or can be integrated in one or more integrated circuits, such as in a system on a chip integrated circuit.

The memory interface 702 can be coupled to memory 750, which can include high-speed random access memory such as static random access memory (SRAM) or dynamic random access memory (DRAM) and/or non-volatile memory, such as but not limited to flash memory (e.g., NAND flash, NOR flash, etc.).

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate the mobile device functionality. One or more biometric sensor(s) 715 may also be present, such as a fingerprint scanner for fingerprint recognition or an image sensor for facial recognition. Other sensors 716 can also be connected to the peripherals interface 706, such as a positioning system (e.g., GPS receiver), a temperature sensor, or other sensing device, to facilitate related functionalities. A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the wireless communication subsystems 724 can depend on the communication network(s) over which a mobile device is intended to operate. For example, a mobile device including the illustrated device architecture 700 can include wireless communication subsystems 724 designed to operate over a GSM network, a CDMA network, an LTE network, a Wi-Fi network, a Bluetooth network, or any other wireless network. In particular, the wireless communication subsystems 724 can provide a communications mechanism over which a media playback application can retrieve resources from a remote media server or scheduled events from a remote calendar or event server.

An audio subsystem 726 can be coupled to a speaker 728 and a microphone 730 to facilitate voice-enabled functions, such as voice recognition, voice replication, digital recording, and telephony functions. In smart media devices described herein, the audio subsystem 726 can be a high-quality audio system including support for virtual surround sound.

The I/O subsystem 740 can include a touch screen controller 742 and/or other input controller(s) 745. For computing devices including a display device, the touch screen controller 742 can be coupled to a touch sensitive display system 746 (e.g., touch-screen). The touch sensitive display system 746 and touch screen controller 742 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 746. Display output for the touch sensitive display system 746 can be generated by a display controller 743. In one embodiment the display controller 743 can provide frame data to the touch sensitive display system 746 at a variable frame rate.

In one embodiment a sensor controller 744 is included to monitor, control, and/or processes data received from one or more of the motion sensor 710, light sensor 712, proximity sensor 714, or other sensors 716. The sensor controller 744 can include logic to interpret sensor data to determine the occurrence of one of more motion events or activities by analysis of the sensor data from the sensors.

In one embodiment the I/O subsystem 740 includes other input controller(s) 745 that can be coupled to other input/control devices 748, such as one or more buttons, rocker switches, thumb-wheel, infrared port, USB port, and/or a pointer device such as a stylus, or control devices such as an up/down button for volume control of the speaker 728 and/or the microphone 730.

In one embodiment, the memory 750 coupled to the memory interface 702 can store instructions for an operating system 752, including portable operating system interface (POSIX) compliant and non-compliant operating system or an embedded operating system. The operating system 752 may include instructions for handling basic system services and for performing hardware dependent tasks. In some implementations, the operating system 752 can be a kernel.

The memory 750 can also store communication instructions 754 to facilitate communicating with one or more additional devices, one or more computers and/or one or more servers, for example, to retrieve web resources from remote web servers. The memory 750 can also include user interface instructions 756, including graphical user interface instructions to facilitate graphic user interface processing.

Additionally, the memory 750 can store sensor processing instructions 758 to facilitate sensor-related processing and functions; telephony instructions 760 to facilitate telephone-related processes and functions; messaging instructions 762 to facilitate electronic-messaging related processes and functions; web browser instructions 764 to facilitate web browsing-related processes and functions; media processing instructions 766 to facilitate media processing-related processes and functions; location services instructions including GPS and/or navigation instructions 768 and Wi-Fi based location instructions to facilitate location based functionality; camera instructions 770 to facilitate camera-related processes and functions; and/or other software instructions 772 to facilitate other processes and functions, e.g., security processes and functions, and processes and functions related to the systems. The memory 750 may also store other software instructions such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. A mobile equipment identifier, such as an International Mobile Equipment Identifier (IMEI) 774 or a similar hardware identifier can also be stored in memory 750.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions may be implemented in hardware and/or in software, including in one or more signal processing and/or application specific integrated circuits.

Figure 8:
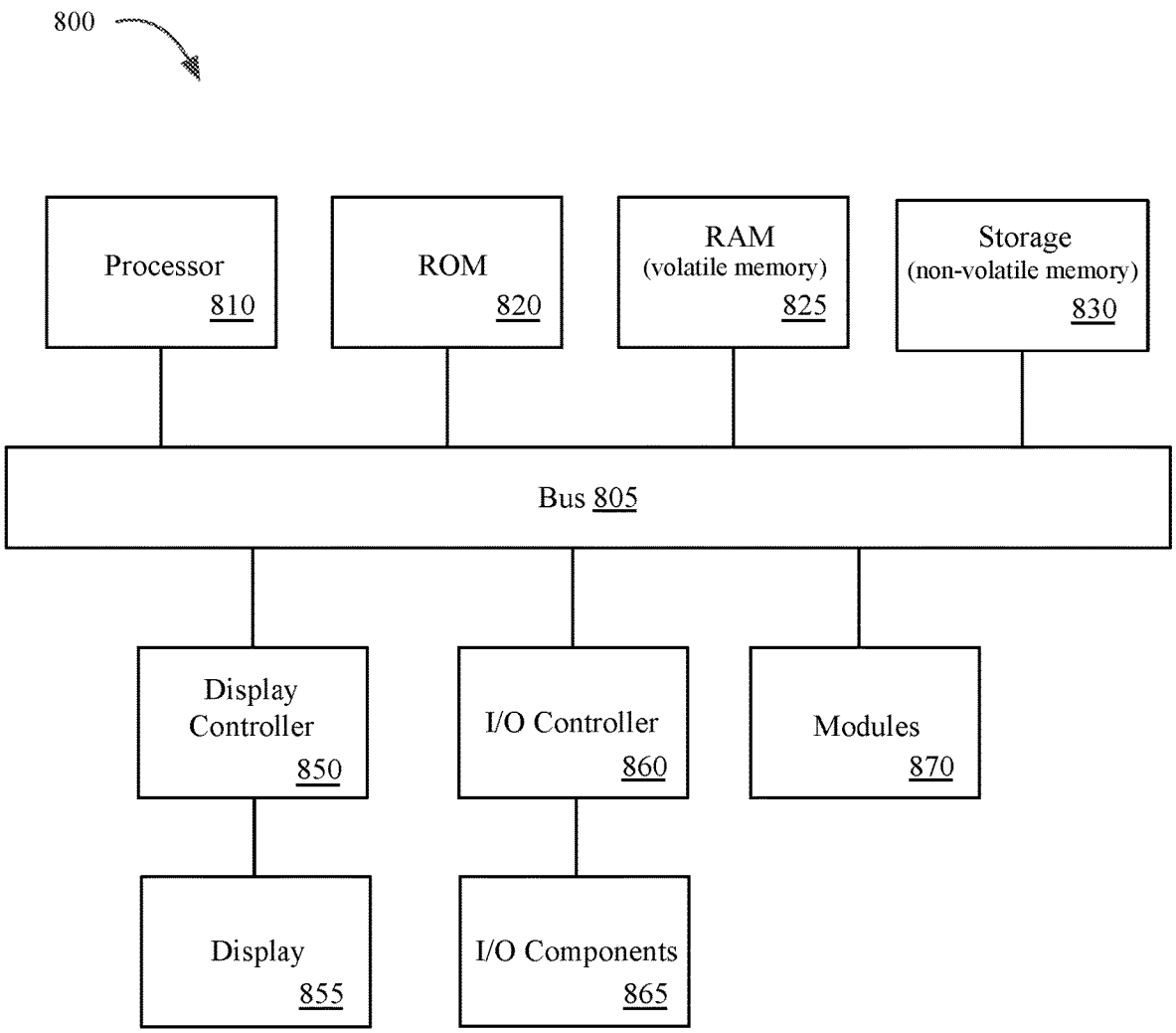
FIG. 8 is a block diagram illustrating a computing system that can be used in conjunction with one or more of the embodiments.

FIG. 8 is a block diagram illustrating a computing system 800 that can be used in conjunction with one or more of the embodiments described herein. The illustrated computing system 800 can represent any of the devices or systems (e.g. client device 110, server 130) described herein that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 800 can include a bus 805 which can be coupled to a processor 810, ROM (Read Only Memory) 820, RAM (or volatile memory) 825, and storage (or non-volatile memory) 830. The processor 810 can retrieve stored instructions from one or more of the memories 820, 825, and 830 and execute the instructions to perform processes, operations, or methods described herein. These memories represent examples of a non-transitory machine-readable medium (or computer-readable medium) or storage containing instructions which when executed by a computing system (or a processor), cause the computing system (or processor) to perform operations, processes, or methods described herein. The RAM 825 can be implemented as, for example, dynamic RAM (DRAM), or other types of memory that require power continually in order to refresh or maintain the data in the memory. Storage 830 can include, for example, magnetic, semiconductor, tape, optical, removable, non-removable, and other types of storage that maintain data even after power is removed from the system. It should be appreciated that storage 830 can be remote from the system (e.g. accessible via a network).

A display controller 850 can be coupled to the bus 805 in order to receive display data to be displayed on a display device 855, which can display any one of the user interface features or embodiments described herein and can be a local or a remote display device. The computing system 800 can also include one or more input/output (I/O) components 865 including mice, keyboards, touch screen, network interfaces, printers, speakers, and other devices. Typically, the input/output components 865 are coupled to the system through an input/output controller 860.

Modules 870 (or components, units, functions, or logic) can represent any of the functions or engines described above, such as, for example, the differential privacy engine 228. Modules 870 can reside, completely or at least partially, within the memories described above, or within a processor during execution thereof by the computing system. In addition, modules 870 can be implemented as software, firmware, or functional circuitry within the computing system, or as combinations thereof.

In some embodiments, the hash functions described herein (e.g. SHA256) can utilize specialized hardware circuitry (or firmware) of the system (client device or server). For example, the function can be a hardware-accelerated function. In addition, in some embodiments, the system can use a function that is part of a specialized instruction set. For example, the can use an instruction set which may be an extension to an instruction set architecture for particular a type of microprocessors. Accordingly, in an embodiment, the system can provide a hardware-accelerated mechanism for performing SHA operations. Accordingly, the system can improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

Accordingly, although such accelerated functions are not necessarily required to implement differential privacy, some embodiments herein, can leverage the prevalence of specialized support for such functions (e.g. cryptographic functions) to potentially improve the overall efficiency of implementations.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally various components described herein can be a means for performing the operations or functions described herein.

With respect to resource requirements, the mechanism may implement a hashing function that provides for the ability to reduce computational requirements by using only a portion of a generated hash value. In order to avoid hash collisions from using only a portion of the hash value, the mechanism may use variants when hashing user data. The use of variants allows the mechanism to implement shared hashing to reduce the number of required computations that must be performed by a client and the server. With respect to utility, the mechanism provides frequency estimations within a predictable deviation that includes a lower bound and an upper bound.

Embodiments described herein provide a privacy mechanism to protect user data when transmitting the data to a server that estimates a frequency moment and $\ell_p$ low-rank approximation based on privatized data received from client devices. In one embodiment, $(\varepsilon, \delta)$-differential privacy is enabled via the shuffle model of privacy.

One embodiment provides a client computing device comprising one or more memory devices, the one or more memory devices to store executable instructions and a dataset having a universe of values, the universe of values having a first number of values and one or more processors configured to execute the instructions stored on the memory device. The instructions cause the one or more processors to implement a local randomizer for the dataset. The local randomizer has a specified privacy parameter and the instructions cause the one or more processors to generate a matrix based on independent and identically distributed samples of a p-stable distribution of the dataset, where the matrix includes a first number of columns, a second number of rows, the first number of columns is larger than the second number of columns, and the first number of columns is the first number of values of the universe. The instructions further cause the one or more processors to generate a sketch having a size based on the second number, apply a first randomization function to the coordinates of the sketch to generate a randomized sketch, and transmit a report to a server, the report including the randomized sketch. The randomized sketch enables estimation of a frequency moment of the universe of values via a non-private estimator while maintaining differential privacy for the dataset.

One embodiment provides a server computing device comprising one or more memory devices, the one or more memory devices to store executable instructions, and one or more processors configured to execute the instructions stored on the memory device. The instructions cause the one or more processors to implement an analyzer to estimate a frequency moment of a dataset and the instructions cause the one or more processors to receive a report from a client device, the report including a randomized sketch, the randomized sketch generated by the client device based on the dataset having a universe of values, the universe of values having a first number of values, and the randomized sketch having a size based on a second number that is less than the first number, wherein the randomized sketch was generated from a randomization matrix having the first number of columns and the second number of rows, combine the randomized sketch from the client device with a set of randomized sketches received from a plurality of other client devices to generate a cumulative sketch, and estimate the frequency moment of the dataset based on the cumulative sketch, wherein the frequency moment is estimated via a first non-private estimator while maintaining differential privacy for the dataset.

One embodiment provides a system comprising a client device including one or more memory devices and one or more processors. The one or more memory devices are to store executable instructions and a dataset having a universe of values, the universe of values having a first number of values and the one or more processors are to execute the instructions stored on the memory device. The instructions cause the one or more processors to implement a local randomizer for the dataset, where the local randomizer has a specified privacy parameter. The instructions additionally cause the one or more processors to perform operations comprising generating a matrix based on independent and identically distributed samples of a p-stable distribution of the dataset, wherein the matrix includes the first number of columns, a second number of rows, and the first number is larger than the second number, generating a sketch having a size based on the second number, applying a first randomization function to the coordinates of the sketch to generate a randomized sketch, and transmitting a report to a server, the report including the randomized sketch, wherein the randomized sketch enables privatized estimation of a frequency moment or a low-rank approximation based on the dataset.

One embodiment provides a method comprising, on a client computing device, generating a matrix based on independent and identically distributed samples of a p-stable distribution of the dataset, wherein the matrix includes the first number of columns, a second number of rows, and the first number is larger than the second number, generating a first randomize sketch of a column space of the matrix, generating a second randomize sketch of a row space of the matrix, generating a third randomize sketch of values of the matrix, transmitting the first, second, and third randomized sketch to a server, where the randomized sketches enables estimation of a privatized low-rank approximation for the dataset.

One embodiment provides an electronic device that includes one or more memory devices that are configured to store executable instructions and a dataset of user data having a known universe of values, where the known universe if values is a first number of values. The one or more processors can be configured to execute the instructions stored on the memory device. The instructions can cause the one or more processors to generate a matrix based on the dataset, where the matrix includes independent and identically distributed samples of the dataset and includes a second number of values that is less than the first number of values, generate a first vector based on the summation matrix, and generate a second vector based on the first vector. The second vector is a randomized shuffle of the first vector. The one or more processors can then transmit the second vector to a server for analysis by a non-private estimator. The non-private estimator is configured to determine an estimate of a frequency moment of the universe of values based on a multiset generated based in part on the second vector. The estimate of the frequency moment is a differentially private estimate, even though the estimate is generated by a non-private estimator.

In the foregoing specification, privacy techniques have been described. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described in accordance with an embodiment. Accordingly, the true scope of the embodiments will become apparent to the skilled practitioner upon a study of the drawings, specification, and following claims.

What is claimed is:

1. A client computing device comprising:
one or more memory devices, the one or more memory devices to store executable instructions and a dataset having a universe of values, the universe of values having a first number of values;
one or more processors configured to execute the instructions stored on the memory device, wherein the instructions cause the one or more processors to implement a local randomizer for the dataset, wherein the local randomizer has a specified privacy parameter and the instructions cause the one or more processors to:
generate a matrix based on independent and identically distributed samples of a p-stable distribution of the dataset, wherein the matrix includes the first number of columns, a second number of rows, and the first number is larger than the second number;
generate a sketch having a size based on the second number;
apply a first randomization function to coordinates of the sketch to generate a randomized sketch; and
transmit a report to a server, the report including the randomized sketch, wherein the randomized sketch enables a privatized estimation of a frequency moment or a low-rank approximation based on the dataset; and wherein the randomized sketch enables estimation of the frequency moment via a non-private estimator while maintaining differential privacy for the dataset, and the privatized estimation of the frequency moment is ($\varepsilon$, $\delta$)-differentially private via a shuffle model of privacy.

2. The client computing device as in claim 1, wherein the frequency moment is a first frequency moment and indicates an estimate of a number of users that contributed to the dataset.

3. The client computing device as in claim 1, the instructions cause the one or more processors to:
generate multiple randomized sketches based on the matrix and the first randomization function, wherein the report transmitted to the server includes the multiple randomized sketches and the report enables the privatized estimation of the low-rank approximation for the dataset.

4. The client computing device as in claim 3, wherein the multiple randomized sketches include a randomized sketch of a column space, a randomized sketch of a row space, and a randomized sketch of values of the matrix.

5. The client computing device as in claim 4, wherein the privatized estimation of the low-rank approximation for the dataset is ($\varepsilon$, $\delta$)-differentially private via the shuffle model of privacy.

6. A server computing device comprising:
one or more memory devices, the one or more memory devices configured to store executable instructions;
one or more processors configured to execute the instructions stored on the memory device, wherein the instructions cause the one or more processors to implement an analyzer to estimate a frequency moment or a low-rank approximation of a dataset and the instructions cause the one or more processors to:
receive a report from a client device, the report including a randomized sketch, the randomized sketch generated by the client device based on the dataset having a universe of values, the universe of values having a first number of values, and the randomized sketch having a size based on a second number that is less than the first number, wherein the randomized sketch was generated from a randomization matrix having the first number of columns and the second number of rows;

combine the randomized sketch from the client device with a set of randomized sketches received from a plurality of other client devices to generate a cumulative sketch; and estimate the frequency moment or the low-rank approximation of the dataset based on the cumulative sketch, wherein the frequency moment is estimated via a first non-private estimator while maintaining differential privacy for the dataset, and wherein the estimate of the frequency moment is ($\varepsilon$, $\delta$)-differentially private via a shuffle model of privacy.

7. The server computing device as in claim 6, wherein the frequency moment is a first frequency moment and indicates an estimate of a number of users that contributed to the dataset.

8. The server computing device as in claim 6, wherein the report includes multiple randomized sketches, and wherein the report enables the server computing device to estimate a privatized low-rank approximation for the dataset.

9. The server computing device as in claim 8, wherein the multiple randomized sketches include a randomized sketch of a column space, a randomized sketch of a row space, and a randomized sketch of values of the randomization matrix.

10. The server computing device as in claim 9, wherein the estimate of the low-rank approximation for the dataset is ($\varepsilon$, $\delta$)-differentially private via the shuffle model of privacy.

11. A computer readable medium storing instructions that, when executed by one or more processors of an electronic device, cause the electronic device to perform operations comprising:

generating a matrix based on independent and identically distributed samples of a p-stable distribution of a dataset stored on the electronic device, the dataset having a universe of values, the universe of values having a first number of values, wherein the matrix includes the first number of columns, a second number of rows, and the first number is larger than the second number;

generating a sketch having a size based on the second number;

applying a first randomization function to coordinates of the sketch to generate a randomized sketch; and transmitting a report to a server, the report including the randomized sketch, wherein the randomized sketch enables a privatized estimation of a frequency moment or a low-rank approximation based on the dataset, wherein the randomized sketch enables estimation of the frequency moment via a non-private estimator while maintaining differential privacy for the dataset, and wherein the privatized estimation of the frequency moment is ($\varepsilon$, $\delta$)-differentially private via a shuffle model of privacy.

12. The computer readable medium of claim 11, wherein the frequency moment is a first frequency moment and indicates an estimate of a number of users that contributed to the dataset.

13. The computer readable medium of claim 11, wherein the operations further comprise:

generating multiple randomized sketches based on the matrix and the first randomization function, wherein the report transmitted to the server includes the multiple randomized sketches and the report enables the privatized estimation of the low-rank approximation for the dataset.

14. The computer readable medium of claim 13, wherein the multiple randomized sketches include a randomized sketch of a column space, a randomized sketch of a row space, and a randomized sketch of values of the matrix.

15. The computer readable medium of claim 13, wherein the privatized estimation of the low-rank approximation for the dataset is ($\varepsilon$, $\delta$)-differentially private via the shuffle model of privacy.

16. A method comprising performing, by an electronic device:

generating a matrix based on independent and identically distributed samples of a p-stable distribution of a dataset stored on the electronic device, the dataset having a universe of values, the universe of values having a first number of values, wherein the matrix includes the first number of columns, a second number of rows, and the first number is larger than the second number;

generating a sketch having a size based on the second number;

applying a first randomization function to coordinates of the sketch to generate a randomized sketch; and transmitting a report to a server, the report including the randomized sketch, wherein the randomized sketch enables a privatized estimation of a frequency moment or a low-rank approximation based on the dataset, wherein the randomized sketch enables estimation of the frequency moment via a non-private estimator while maintaining differential privacy for the dataset, and wherein the privatized estimation of the frequency moment is ($\varepsilon$, $\delta$)-differentially private via a shuffle model of privacy.

17. The method of claim 16, wherein the frequency moment is a first frequency moment and indicates an estimate of a number of users that contributed to the dataset.

18. The method of claim 16, further comprising:

generating multiple randomized sketches based on the matrix and the first randomization function, wherein the report transmitted to the server includes the multiple randomized sketches and the report enables the privatized estimation of the low-rank approximation for the dataset.

19. The method of claim 18, wherein the multiple randomized sketches include a randomized sketch of a column space, a randomized sketch of a row space, and a randomized sketch of values of the matrix.

20. The method of claim 18, wherein the privatized estimation of the low-rank approximation for the dataset is ($\varepsilon$, $\delta$)-differentially private via the shuffle model of privacy.

21. A method comprising performing, by a server computing device:

receive a report from a client device, the report including a randomized sketch, the randomized sketch generated by the client device based on a dataset having a universe of values, the universe of values having a first number of values, and the randomized sketch having a size based on a second number that is less than the first number, wherein the randomized sketch was generated from a randomization matrix having the first number of columns and the second number of rows;

combine the randomized sketch from the client device with a set of randomized sketches received from a plurality of other client devices to generate a cumulative sketch; and estimate a frequency moment or a low-rank approximation of the dataset based on the cumulative sketch, wherein the frequency moment is estimated via a first non-private estimator while maintaining differential privacy for the dataset, and wherein the estimate of the frequency moment is ($\varepsilon$, $\delta$)-differentially private via a shuffle model of privacy.

22. The method of claim 21, wherein the frequency moment is a first frequency moment and indicates an estimate of a number of users that contributed to the dataset.

23. The method of claim 21, wherein the report includes multiple randomized sketches, and wherein the report enables the server computing device to estimate a privatized low-rank approximation for the dataset.

24. The method of claim 23, wherein the multiple randomized sketches include a randomized sketch of a column space, a randomized sketch of a row space, and a randomized sketch of values of the randomization matrix.

25. The method of claim 23, wherein the estimate of the low-rank approximation for the dataset is ($\varepsilon$, $\delta$)-differentially private via the shuffle model of privacy.

* * * * *